US012602933B2

(12) United States Patent
Goswami et al.

(10) Patent No.: US 12,602,933 B2
(45) Date of Patent: Apr. 14, 2026

(54) VEHICULAR SENSING SYSTEM WITH OCCLUSION ESTIMATION FOR USE IN CONTROL OF VEHICLE

(71) Applicant: Magna Electronics Inc., Auburn Hills, MI (US)

(72) Inventors: Ashesh Goswami, Somerville, MA (US); Kevin S. O'Brien, Somerville, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 30 days.

(21) Appl. No.: 18/739,722

(22) Filed: Jun. 11, 2024

(65) Prior Publication Data

US 2024/0412531 A1     Dec. 12, 2024

Related U.S. Application Data

(60) Provisional application No. 63/507,481, filed on Jun. 12, 2023.

(51) Int. Cl.
*G06V 20/58* (2022.01)
*B60W 10/04* (2006.01)
(Continued)

(52) U.S. Cl.
CPC ............. *G06V 20/58* (2022.01); *B60W 10/04* (2013.01); *B60W 10/20* (2013.01); *G01S 13/89* (2013.01);
(Continued)

(58) Field of Classification Search
CPC ................. B60W 10/04; B60W 10/20; B60W 2420/403; B60W 2420/408;
(Continued)

(56) References Cited

U.S. PATENT DOCUMENTS

| | | | |
|---|---|---|---|
| 7,038,577 B2 * | 5/2006 | Pawlicki ............. | B60W 30/143 340/436 |
| 7,720,580 B2 * | 5/2010 | Higgins-Luthman ........................ | G06V 20/58 701/28 |

(Continued)

FOREIGN PATENT DOCUMENTS

| | | | | |
|---|---|---|---|---|
| EP | 3123450 B1 * | 12/2022 | ............. | G06F 18/24 |
| GB | 2609994 A * | 2/2023 | ........... | G06V 30/274 |

(Continued)

*Primary Examiner* — Babar Sarwar
(74) *Attorney, Agent, or Firm* — HONIGMAN LLP

(57) ABSTRACT

A vehicular sensing system includes a sensor disposed at a vehicle. The vehicular sensing system generates a three-dimensional point cloud of data representing a three-dimensional scene exterior of the vehicle within a field of sensing of the sensor. The virtual range image includes a set of points representing the three-dimensional point cloud of data. The system, for each respective point, classifies the respective point as occluded or non-occluded. The system determines one or more occlusion regions based on the classification for the respective points. Each occlusion region includes a region that is within the field of sensing of the sensor but that is not sensed by the sensor due to an object obstructing the sensor from the sensing region. The system tracks a moving detected object as it enters an occlusion region and predicts where the moving detected object will exit from the occlusion region.

26 Claims, 7 Drawing Sheets sample of a query region constant height / z-slice

Range-image created from lidar pointcloud

Query region as projected on an empty range-image

Occlusion regions as observed in range-image as well as when projected onto the 3d scene

(51) Int. Cl.

| | |
|---|---|
| *B60W 10/20* | (2006.01) |
| *G01S 13/89* | (2006.01) |
| *G01S 13/931* | (2020.01) |
| *G06T 7/246* | (2017.01) |

(52) U.S. Cl.

CPC ........... *G01S 13/931* (2013.01); *G06T 7/248* (2017.01); *B60W 2420/403* (2013.01); *B60W 2420/408* (2024.01); *B60W 2420/54* (2013.01); *B60W 2556/45* (2020.02); *B60W 2710/20* (2013.01); *B60W 2720/106* (2013.01); *G06T 2207/10028* (2013.01); *G06T 2207/30252* (2013.01)

(58) Field of Classification Search

CPC ......... B60W 2420/54; B60W 2556/45; B60W 2710/20; B60W 2720/106; G01S 13/862; G01S 13/865; G01S 13/89; G01S 13/931; G06T 2207/10028; G06T 2207/20068; G06T 2207/30241; G06T 2207/30252; G06T 2207/30261; G06T 7/246; G06T 7/248; G06V 20/58

See application file for complete search history.

(56) References Cited

U.S. PATENT DOCUMENTS

| | | | | |
|---|---|---|---|---|
| 7,855,755 | B2 * | 12/2010 | Weller | G02F 1/133385 |
| | | | | 349/1 |
| 8,013,780 | B2 * | 9/2011 | Lynam | G01S 13/93 |
| | | | | 342/55 |
| 8,027,029 | B2 * | 9/2011 | Lu | G01S 7/4817 |
| | | | | 356/28 |
| 8,665,079 | B2 * | 3/2014 | Pawlicki | G01S 13/867 |
| | | | | 340/436 |
| 9,036,026 | B2 * | 5/2015 | Dellantoni | G01C 21/3679 |
| | | | | 348/148 |
| 9,146,898 | B2 * | 9/2015 | Ihlenburg | B60W 10/18 |
| 9,280,202 | B2 * | 3/2016 | Gieseke | G01C 21/365 |
| 9,689,967 | B1 * | 6/2017 | Stark | G01S 7/0233 |
| 9,753,121 | B1 * | 9/2017 | Davis | G01S 7/282 |
| 9,954,955 | B2 * | 4/2018 | Davis | G01S 13/34 |
| 10,157,322 | B1 * | 12/2018 | Divekar | B60T 7/22 |
| 10,268,904 | B2 * | 4/2019 | Gupta | G06V 20/588 |
| 10,866,306 | B2 * | 12/2020 | Maher | G11C 11/409 |
| 10,909,392 | B1 * | 2/2021 | Chaudhuri | G05D 1/0214 |
| 11,263,444 | B2 * | 3/2022 | Datta | G06T 7/0016 |
| 11,763,410 | B1 * | 9/2023 | Roy | H04L 9/40 |
| | | | | 701/117 |
| 11,807,169 | B2 * | 11/2023 | Baur | B60R 1/24 |
| 2005/0179527 | A1 * | 8/2005 | Schofield | B60Q 9/008 |
| | | | | 348/148 |
| 2008/0192984 | A1 * | 8/2008 | Higuchi | G06V 20/56 |
| | | | | 382/104 |
| 2013/0116859 | A1 * | 5/2013 | Ihlenburg | B60W 10/18 |
| | | | | 701/1 |
| 2017/0323179 | A1 * | 11/2017 | Vallespi-Gonzalez | |
| | | | | G06V 20/58 |
| 2017/0356994 | A1 * | 12/2017 | Wodrich | G01S 13/87 |
| 2019/0122378 | A1 * | 4/2019 | Aswin | G06T 7/571 |
| 2019/0277968 | A1 * | 9/2019 | Lu | G06V 10/147 |
| 2019/0311546 | A1 * | 10/2019 | Tay | G06T 7/521 |
| 2019/0339382 | A1 * | 11/2019 | Hess | H04B 7/0413 |
| 2020/0223429 | A1 * | 7/2020 | Marsousi | G05D 1/0257 |
| 2020/0327343 | A1 * | 10/2020 | Lund | G06T 7/50 |
| 2021/0061276 | A1 * | 3/2021 | Zhang | B60W 10/18 |
| 2021/0192757 | A1 * | 6/2021 | Yu | G06N 3/084 |
| 2021/0201056 | A1 * | 7/2021 | Potnis | G06N 3/0475 |
| 2021/0221390 | A1 * | 7/2021 | Slobodyanyuk | G01S 7/40 |
| 2021/0385865 | A1 * | 12/2021 | Mueck | H04W 74/0875 |
| 2021/0392454 | A1 * | 12/2021 | Choi | H04L 27/2613 |
| 2022/0024485 | A1 * | 1/2022 | Theverapperuma | |
| | | | | G01C 21/3635 |
| 2022/0048566 | A1 * | 2/2022 | Prasad Challa | B60W 40/04 |
| 2022/0097625 | A1 * | 3/2022 | Russell | B60R 1/12 |
| 2022/0105931 | A1 * | 4/2022 | Motegi | B60W 30/12 |
| 2023/0093053 | A1 * | 3/2023 | Joseph | H04W 4/40 |
| | | | | 340/932.2 |
| 2023/0135234 | A1 * | 5/2023 | Wang | G06V 10/774 |
| | | | | 382/103 |

FOREIGN PATENT DOCUMENTS

| | | | | | |
|---|---|---|---|---|---|
| KR | 20230055816 | A | * | 4/2023 | G06T 7/11 |
| WO | WO-2023055366 | A1 | * | 4/2023 | G06V 10/82 |

* cited by examiner

VEHICULAR SENSING SYSTEM WITH OCCLUSION ESTIMATION FOR USE IN CONTROL OF VEHICLE

CROSS REFERENCE TO RELATED APPLICATION

The present application claims the filing benefits of U.S. provisional application Ser. No. 63/507,481, filed Jun. 12, 2023, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular sensing system includes a sensor disposed at a vehicle equipped with the vehicular sensing system and sensing exterior of the vehicle. The vehicular sensing system includes an electronic control unit (ECU) including electronic circuitry and associated software. The sensor is operable to capture sensor data. The electronic circuitry of the ECU includes a data processor for processing sensor data captured by the sensor. The vehicular sensing system, via processing at the ECU of sensor data captured by the sensor, generates a three-dimensional point cloud of data representing a three-dimensional scene exterior of the vehicle within a field of sensing of the sensor. Based at least in part on the three-dimensional point cloud of data, the vehicular sensing system generates a virtual range image for the three-dimensional point cloud of data. The virtual range image includes a set of points representing the three-dimensional point cloud of data. Each point of the set of points includes a respective location and a respective range value. For each respective point of the set of points, the vehicular sensing system classifies the respective point as occluded or non-occluded by comparing the respective range value with a threshold range value associated with that respective point. The vehicular sensing system determines one or more occlusion regions based on the classification for the respective points. Each occlusion region includes a region that is within the field of sensing of the sensor but that is not sensed by the sensor due to an object obstructing the sensor from sensing the region. The vehicular sensing system tracks a moving detected object as it enters an occlusion region and predicts where the moving detected object will exit from the occlusion region.

These and other objects, advantages, purposes and features of the present invention will become apparent upon review of the following specification in conjunction with the drawings.

DESCRIPTION OF THE PREFERRED EMBODIMENTS

Figure 1:
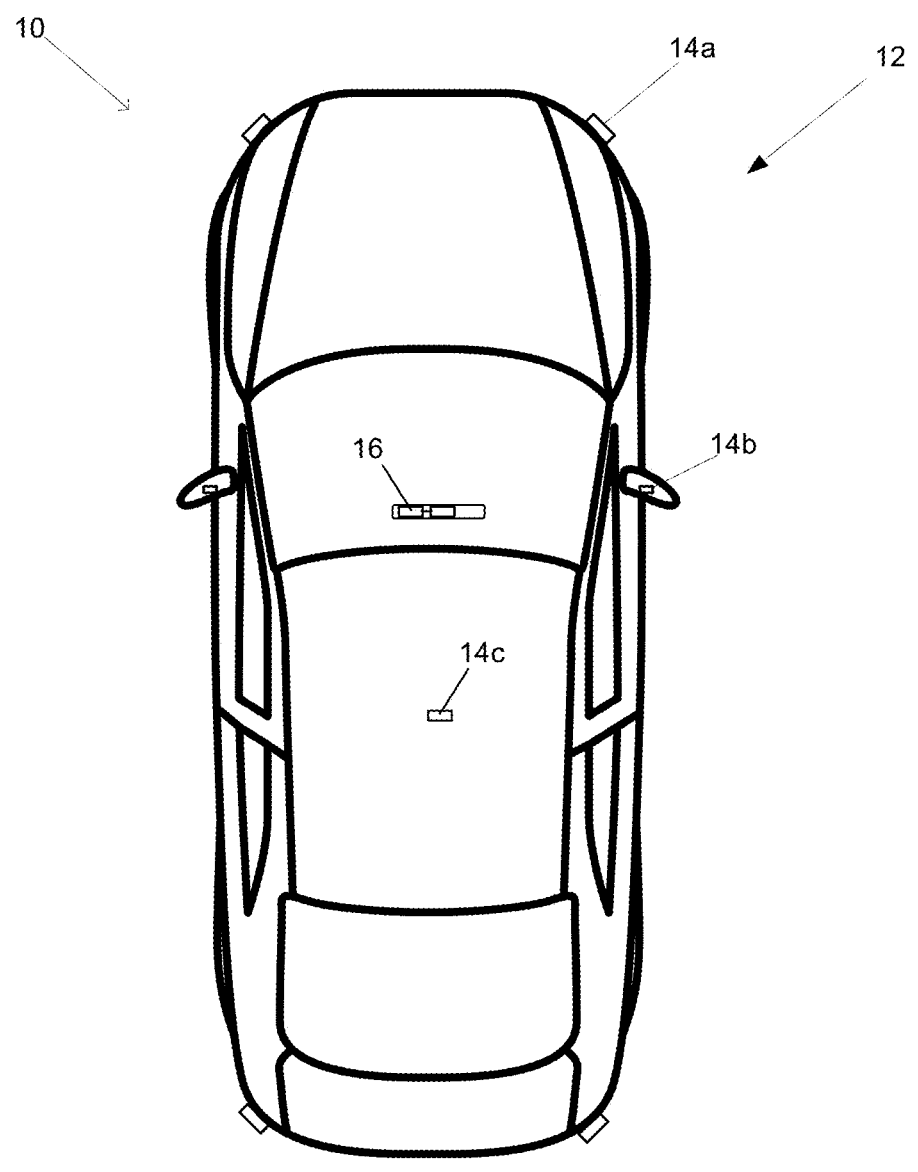
FIG. 1 is a plan view of a vehicle with a sensing system that incorporates sensors.

A vehicular sensing system and/or driving assist system operates to capture data representative of the exterior of the vehicle and may process the captured data to detect objects at or near the vehicle and in the area of the vehicle, such as to assist a driver of the vehicle in maneuvering the vehicle in a forward or rearward direction. The sensing system includes a processor or processing system that is operable to receive sensor data from one or more sensors (e.g., radar sensors, lidar sensors, ultrasonic sensors, imaging sensors, etc.).

Referring now to the drawings and the illustrative embodiments depicted therein, a vehicle 10 (FIG. 1) includes an driving assistance system or vehicular sensing system 12 that includes at least one exterior viewing sensor 14, such as a radar sensor, a lidar sensor, an ultrasonic sensor, and/or an imaging sensor (e.g., a camera), which, for example, may be disposed at one or both exterior rearview mirrors 14b at one or both sides of the vehicle, at one or more corners 14a of the vehicle (e.g., at a corner of a bumper), and/or at a rooftop 14c of the vehicle. The sensor(s) capture sensor data representative of the scene occurring exterior of the vehicle (e.g., at least forward, and/or rearward of the vehicle). The vehicular sensing system 12 includes a control or electronic control unit (ECU) 16 having electronic circuitry and associated software, with the electronic circuitry including a data processor or image processor that is operable to processor sensor data captured by the sensors, whereby the vehicular sensing system or ECU may detect or determine presence of objects or the like and alert an occupant of the vehicle and/or control movement of the vehicle. The data transfer or signal communication from the camera to the ECU may comprise any suitable data or communication link, such as a vehicle network bus or the like of the equipped vehicle.

Autonomous vehicles and vehicles with driving assistance systems require a detailed understanding of an environment surrounding the vehicle to make informed decisions when controlling operation of the vehicle (e.g., accelerating, decelerating, steering, etc.). To perceive and understand the surrounding area, the vehicular sensing system of the vehicle processes the sensor data from the sensors to detect dynamic and/or static objects nearby the vehicle. Sensors provide information about the area surrounding the vehicle thereby enabling vehicular sensing systems to perceive and understand the scene occurring exterior of the vehicle. Yet, in many scenarios objects block a field of sensing or region or sub-region of the field of sensing of the sensors such that controlling operation of the vehicle is frequently based on a limited perception about objects surrounding the vehicle.

For example, a vehicle equipped with a vehicular sensing system may detect a first object located proximally to the equipped vehicle and present in the field of sensing of the sensors, but fail to detect a second object located behind the first object and distally from the equipped vehicle. Here, the failure to detect the second object is due to the first object obstructing the second object from the field of sensing of the sensors. More specifically, because the sensors are unable to sense an area located behind a moving detected object (e.g., the area behind the first object detected by the vehicular sensing system), any objects located behind the detected object are not perceived by the vehicular sensing system. As used herein, the area located behind a detected object that sensors are unable to sense is referred to as an "occlusion region." Notably, the sensors would otherwise sense the objects located in the occlusion regions if the detected object (i.e., the occluding object) did not obstruct the sensor from sensing the objects in the occlusion region. Thus, once the detected object no longer obstructs objects in the occlusion region (e.g., because the detected object moves and/or the objects in the occlusion region move), these objects that were previously not perceived by the vehicular sensing system seem to suddenly appear. As such, identifying occlusion regions allows vehicles to plan for (i.e., anticipate) objects appearing from the identified occlusion regions once the obstruction is removed. Advantageously, anticipating these otherwise unexpected objects enables autonomous vehicles and/or vehicles with driver assistance systems to make quicker and more informed decisions when maneuvering the vehicle.

One approach to occlusion estimation includes a 2-dimensional (2D) grid-based approach that consumes a relatively low amount of computing resources (e.g., data processing hardware and/or memory hardware) but may produce a less accurate occlusion estimation. In particular, the two-dimensional grid-based approach is less accurate due to leaving out relevant height information. Another approach to occlusion estimation includes a three-dimensional raytracing approach that consumes a relatively high amount of computing resources but produces a more accurate occlusion estimation by incorporating relevant height information. Yet, this three-dimensional raytracing approach is not suitable for vehicle applications due to the relatively high amount of computing resource consumption.

Figure 2:
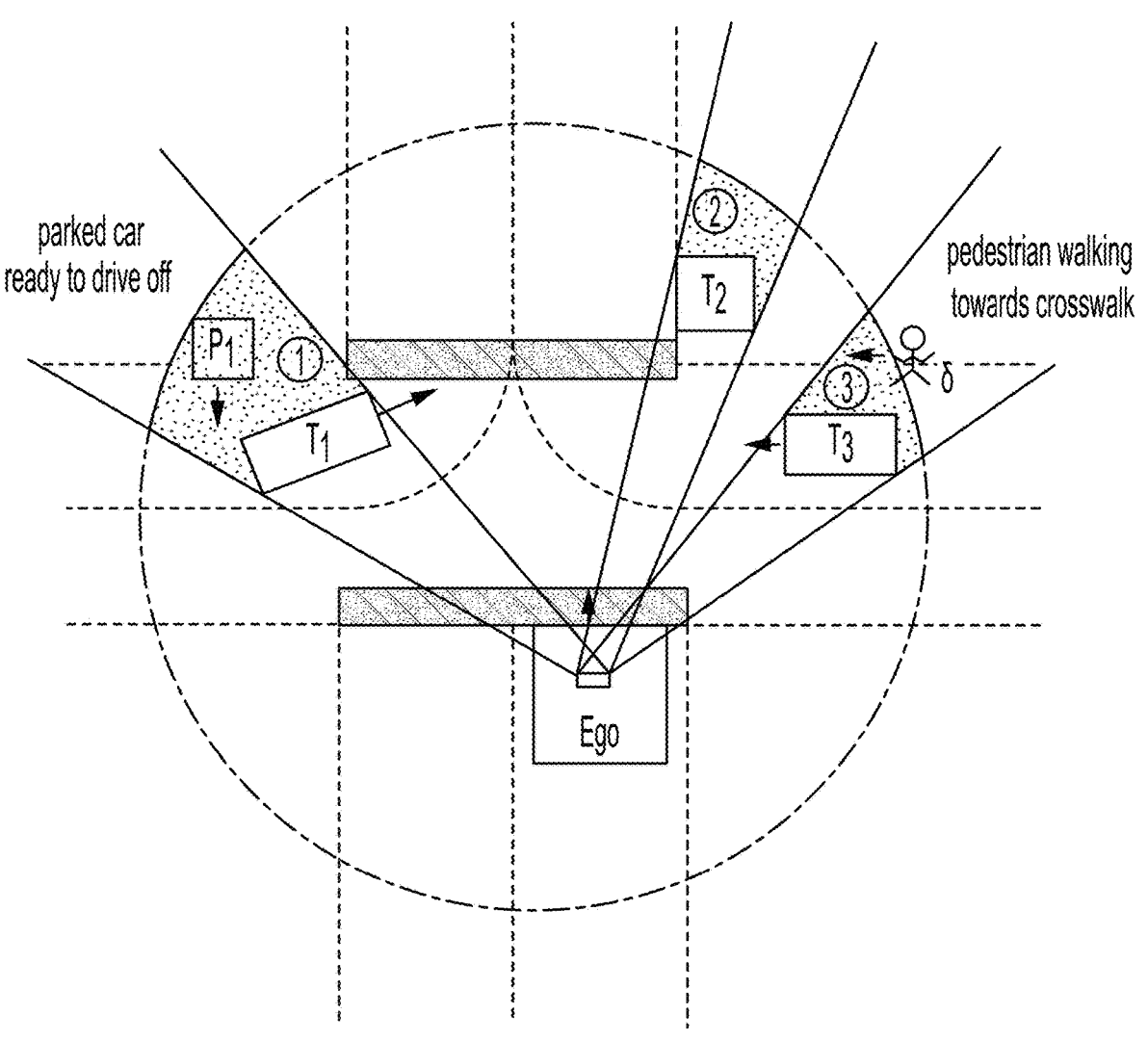
FIG. 2 is a plan view of a vehicle stopped at an intersection with multiple occlusion regions.

In FIG. 2, the equipped vehicle 10 includes a roof-top mounted sensor (although the vehicle may otherwise include a plurality of sensors disposed at different portions of the vehicle, such as shown in FIG. 1) and is stopped at an intersection. In this exemplary scenario, a first object T1, a second object T2, and a third object T3, each obstruct an area located behind the respective object (i.e., denoted by hatching) from a field of sensing of the sensor (e.g., occlusion region). Thus, the vehicular sensing system only perceives the first, second, and third objects, but fails to perceive a parked car A located in the occlusion region behind the first object T1 or the pedestrian B located in the occlusion region behind the third object T3. If the first or second object moves (or the parked car A or the pedestrian B moves) such that the parked car A or the pedestrian B are no longer in an occlusion zone, the parked car A and the pedestrian B will seem to suddenly appear to the vehicular sensing system. In the example shown, the occlusion region behind the second object T2 does not conceal any objects from the field of sensing of the sensor, however, the vehicular sensing system is unable to differentiate between an occlusion region that conceals an object from the vehicle sensing system and an occlusion region that does not conceal any objects from the vehicle sensing system.

Implementations herein are directed towards the vehicular sensing system 12 that includes sensors (e.g., lidar, radar, ultrasonic sensors, and/or imaging sensors) sensing exterior of the vehicle by capturing sensor data. The sensors may be located at one or both side mirrors of the vehicle and/or at a roof-top of the vehicle. Additionally or alternatively, the sensors may be located at front and/or rear corners of the vehicle, such as each corner of the vehicle (e.g., at the bumpers). The vehicular sensing system may include an electronic control unit (ECU) having a data processor for processing sensor data captured by the sensor to generate a three-dimensional point cloud of data representing a three-dimensional scene exterior of the vehicle and within a field of sensing of the sensor. The three-dimensional point cloud of data includes an x-dimension or coordinate, a y-dimension or coordinate, and a z-dimension or coordinate, where each three-dimensional point includes a respective x-dimension, a respective y-dimension, and a respective z-dimension. In some examples, the x-dimension or coordinate represents an azimuth dimension of the three-dimensional point cloud of data, the y-dimension or coordinate represents an elevation dimension of the three-dimensional point cloud of data, and the z-dimension or coordinate represents a range/depth dimension of the three-dimensional point cloud of data.

The vehicular sensing system may utilize 2.5-dimensional information by leveraging a depth buffer (i.e., Z-buffer) and applying the 2.5 dimensional information to information obtained from the three-dimensional point cloud. Advantageously, using the 2.5-dimensional information enables more realistic occlusion region estimation (e.g., as compared to the two-dimensional occlusion estimation approach) while reducing the computing resources consumed by the vehicular sensing system (e.g., as compared to the three-dimensional occlusion estimation approach). The depth buffer stores, at each respective pixel location of a plurality of pixels of an image (displayed on a display screen), a recording of a depth of an object (or absence of an object) at the respective pixel location that lies closest to the sensor. Moreover, the depth buffer stores an intensity at each respective pixel that represents the depth of the object. As such, surface depths at each pixel position on the projection plane are then compared to distinguish between foreground and background pixels in the scene surrounding the vehicle.

Based on the three-dimensional point cloud of data representing exterior of the vehicle, the vehicular sensing system generates a whole range image for the three-dimensional point cloud of data and generates a query region range image for a respective portion of the three-dimensional point cloud of data. Generating the whole range image for the three-dimensional point cloud of data may include projecting each respective three-dimensional point of the plurality of three-dimensional points onto a two-dimensional image plane. Put another way, generating the whole range image for the three-dimensional point cloud of data includes compressing the three-dimensional information into a corresponding whole range image that preserves azimuth information, elevation information, and range (e.g., depth) information from the three-dimensional point cloud of data. Thus, the whole range image represents range/depth information for each detected object in the three-dimensional point cloud of data.

The two-dimensional image plane includes the x-dimension and the y-dimension (e.g., corresponding to the x-dimension and the y-dimension of the three-dimensional point cloud) at a particular z-dimension (e.g., at a given height of the three-dimensional point cloud). Here, the whole range image represents an entirety of the three-dimensional point cloud of data and includes a first set of first pixels. Each first pixel includes a respective coordinate (e.g., x, y coordinate) and represents a range value at the respective coordinate that indicates a range/depth of any detected object at the respective coordinate. More specifically, the vehicular sensing system may determine the respective coordinate for each first pixel based on azimuth and elevation bins of the associated three-dimensional point. Each respective first pixel represents the range/depth of a detected object based on an intensity of the respective first pixel.

Figure 3:
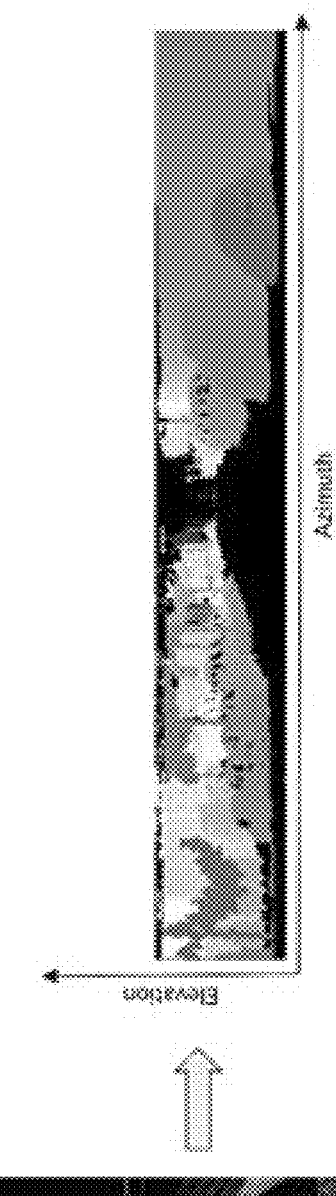
FIG. 3 is a graphical representation of an example three-dimensional point cloud of data and an associated whole range image generated from the three-dimensional point cloud of data.
Figure 3:
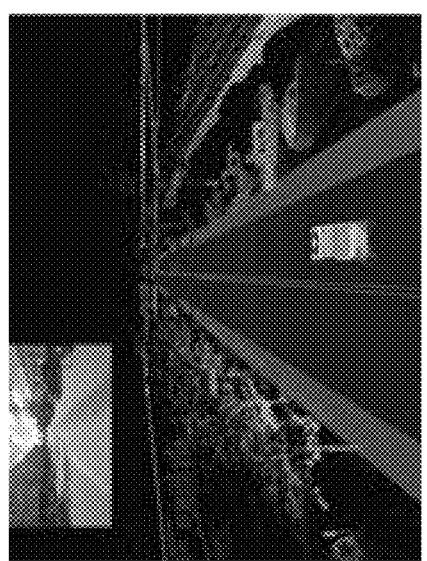

FIG. 3 shows an example three-dimensional point cloud of data and an associated two-dimensional image snapshot (left) and an example whole range image generated from the example three-dimensional point cloud of data. Notably, the whole range image preserves the azimuth, elevation information, and range (depth) information from the three-dimensional point cloud of data. In particular, the whole range image indicates the range information by a pixel intensity of each pixel. That is, the pixel intensity indicates the range information from the three-dimensional point cloud of data. For instance, lower intensity pixels represent objects located far from the sensor while higher intensity pixels represent objects located near the sensor.

On the other hand, generating the query region range image includes detecting a respective portion (i.e., region of interest) of the three-dimensional point cloud of data. The region of interest represents a particular region that the vehicular sensing system processes to gain a better understanding of any present occlusion regions. Detecting the region of interest may include detecting an area around an object present within a field of sensing of the sensor and/or determining that the detecting object is within a predicted path of travel of the vehicle.

The vehicular sensing system may generate the query region range image by projecting each respective three-dimensional point from a respective portion of the three-dimensional point cloud onto a two-dimensional plane. In contrast to projecting every three-dimensional point while generating the whole range image, the vehicular sensing system only projects three-dimensional points from the respective portion of the three-dimensional point cloud while generating the query region image. Similarly, the two-dimensional plane includes the x-dimension and the y-dimension (e.g., corresponding to the x-dimension and the y-dimension of the three-dimensional point cloud) at a particular z-dimension (e.g., at a given height of the three-dimensional point cloud). Here, the query region range image represents the respective portion of the three-dimensional point cloud of data the vehicular sensing system processes to identify an extent (if any) of an occlusion region present in the respective portion. The query region range image includes a second set of second pixels that each may include a respective coordinate (e.g., x, y coordinate) and that represents a range value at the respective coordinate that indicates a range/depth of any detected object at the respective coordinate.

In some implementations, the vehicular sensing system initializes the range value for each second pixel to a maximum depth/range value such that, initially, each second pixel represents background (e.g., no detected objects) from the three-dimensional point cloud. Put another way, the vehicular sensing system may generate the query region range image by projecting each three-dimensional point onto an empty range image. Notably, each second pixel in the second set of pixels includes a corresponding first pixel in the first set of pixels. As such, the vehicular sensing system may compare the range value for each second pixel (e.g., corresponding to a three-dimensional point of a region of interest from the three-dimensional point cloud) in the second set of second pixels to a corresponding one of the first pixels in the first set of first pixels. Since the range value at each second pixel is set to the maximum range value, the comparison informs the vehicular sensing system whether the object at any of the first pixels is closer to the equipped vehicle than the maximum range value.

To that end, the vehicular sensing system classifies each respective second pixel $(x_i, y_i)$ in the second set of second pixels as occluded or non-occluded to identify the extent (if any) of an occlusion region in the respective portion of the three-dimensional point cloud. In particular, the system compares the respective range value (e.g., which may be initialized or non-initialized) for each second pixel to the range value of a corresponding first pixel. That is, the respective second pixel and the corresponding first pixel share a same respective coordinate such that the range values may be compared to determine whether the second pixel is occluded or non-occluded.

In some examples, the vehicular sensing system determines whether the range value of the respective second pixel is greater than or less than the range value of the corresponding first pixel. In these examples, responsive to determining that the range value of the respective second pixel is greater than the range value of the corresponding first pixel, the vehicular sensing system classifies the respective second pixel as occluded. Conversely, responsive to determining that the range value of the respective second pixel is less than the range value of the corresponding first pixel, the vehicular sensing system classifies the respective second pixel as non-occluded. After classifying each respective second pixel, the classifications indicates whether the pixel is occluded (e.g., represents a detected object proximal to the sensor) or non-occluded (e.g., represents non-existence of a detected object region of interest or another object closer to the sensor). To generate an occlusion map representing exterior of the vehicle, the vehicular sensing system projects the classification for each respective second pixel in the second set of pixels onto the three-dimensional point cloud of data.

The occlusion map defines one or more occlusion regions from the three-dimensional point cloud of data. Each occlusion region represents an area not within the field of sensing of the sensor that is located behind a detected object and distal from the sensor. Thus, each area not within the field of sensing of the sensor may include at least one object not currently perceivable by the sensor due to the detected object being proximal to the sensor and the at least one object being distal from the sensor. The vehicular sensing system continuously updates the occlusion map as the vehicle moves relative to the objects and/or objects move relative to the vehicle. Moreover, the vehicular sensing system may track movements of detected objects such that the vehicular sensing system may predict whether a detected object enters into or exits from the area not within the field of sensing of the sensor of an occlusion region. To this end, the vehicular sensing system has a more informed understanding of its environment by tracking objects entering into or exiting from occlusion regions. This is in contrast to not accounting for occlusion regions whereby objects seemingly suddenly appear into, or disappear from, areas not within the field of sensing of a sensor.

Figure 4:
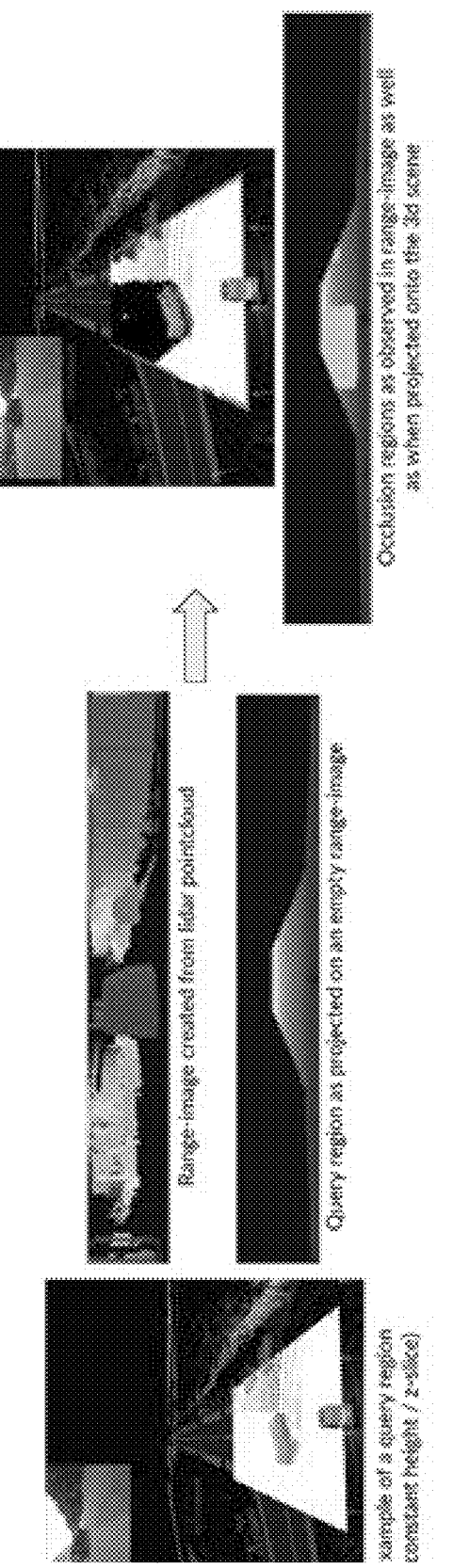
FIG. 4 is a schematic of generating an occlusion map for an example query region of a three-dimensional point cloud of data.
Figure 5:
FIGS. 5-7 are graphical representations of occlusion maps for example three-dimensional point clouds of data.
Figure 6:
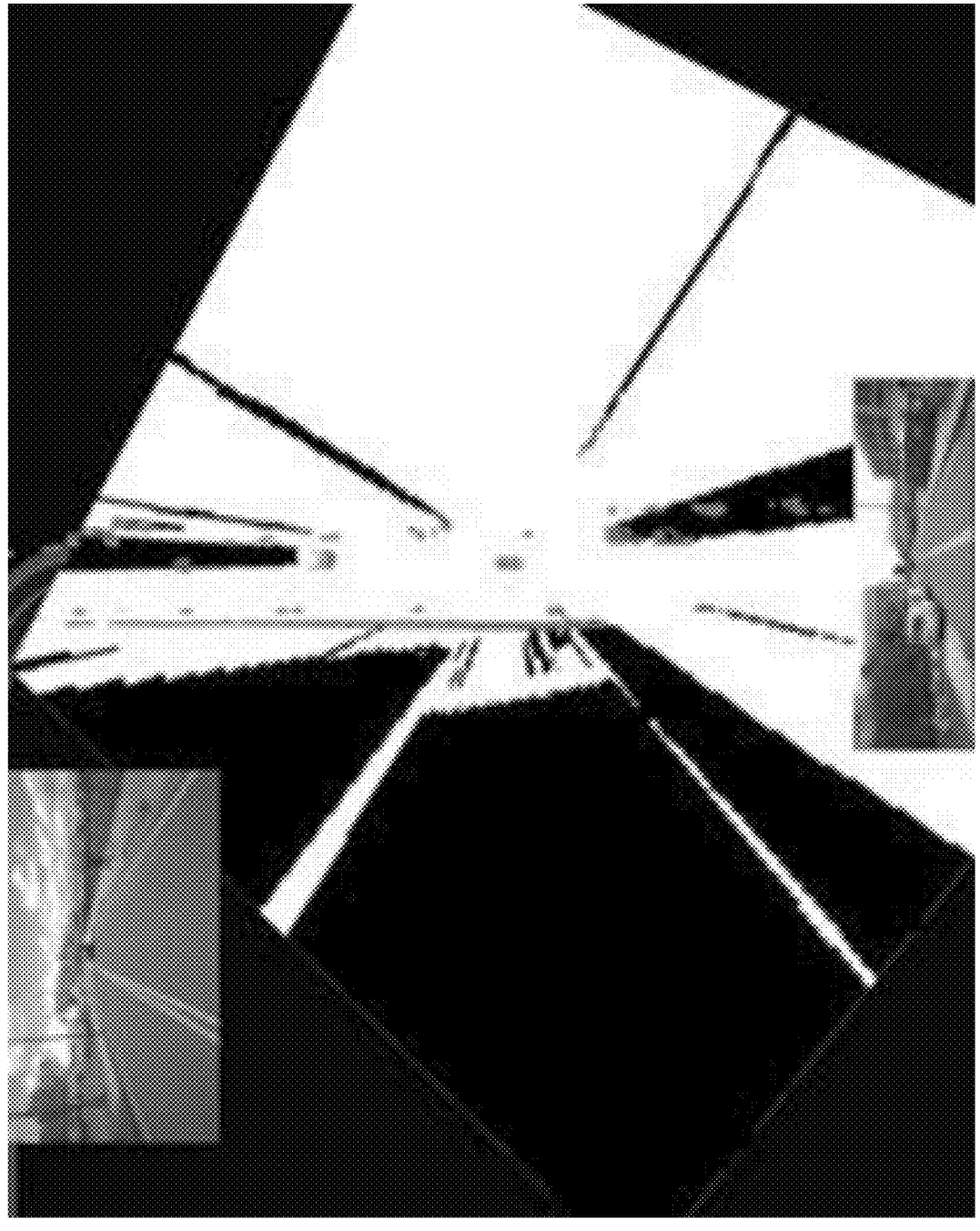
Figure 7:
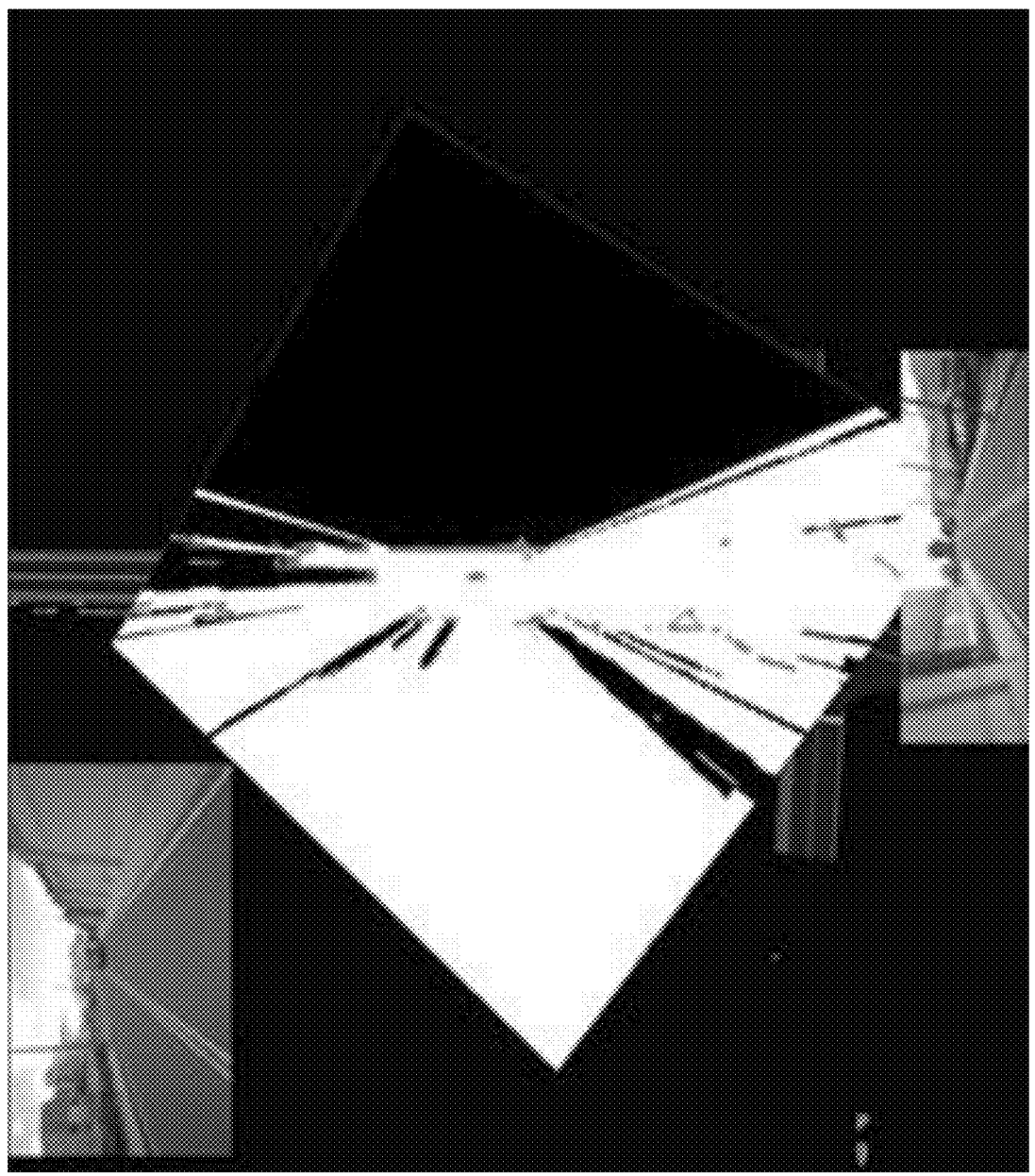

For example, FIG. 4 shows an example query region at a particular height (e.g., denoted by the white box of the example query region) and an occlusion map that includes the classification for each pixel from the query region. Here, the white pixels in the query region of the occlusion map indicate non-occluded classifications and the black pixels in the query region of the occlusion map indicate occluded classifications. As such, the non-occluded classifications (e.g., black pixels) represent an occlusion region that the sensor of a vehicle is unable to perceive. Similarly, FIGS. 5-7 show example occlusion maps where white pixels indicate non-occluded (i.e., free) classifications and black pixels indicate occluded (i.e., obstructed classifications). The vehicular sensing system may output the occlusion map to other systems of the vehicle (e.g., autonomous vehicle controller or driver assistance system) that process the occlusion map, more specifically the identified occlusion regions, to anticipate/predict any objects not detected by the vehicular sensing system when maneuvering the vehicle (e.g., accelerating, decelerating, steering, etc.).

As described above, the vehicular sensing system generates a three-dimensional point cloud of data representing an area surrounding the vehicle and compresses the three-dimensional point cloud of data into range images. Advantageously, the vehicular sensing system processes the range images to classify each pixel in a query region (e.g., a region of interest that may include an occlusion region) to generate an occlusion map by projecting the classification for each pixel onto the three-dimensional point cloud of data. In particular, processing the range images to generate the occlusion map (as opposed to processing the three-dimensional point cloud of data directly) minimizes an amount of computing resources required to generate the occlusion map because the range images only include two-dimensions (e.g., x-dimension and y-dimension) or two-and-a-half-dimensions (e.g., x-dimension and y-dimension where each coordinate stores range information) as opposed to the three-dimensions of the point cloud. The vehicular sensing system may generate the occlusion map at a particular z-dimension (e.g., particular height) of the three-dimensional point cloud of data. Alternatively, the vehicular sensing system may generate occlusion maps with more comprehensive information about the area surrounding the vehicle by generating range images at multiple heights and then stacking the classifications for each height to generate the occlusion map. That is, the vehicular sensing system may generate the occlusion map at multiple z-dimensions (e.g., multiple heights) of the three-dimensional point cloud of data. This approach is in contrast to generating range images at a single height and generating the occlusion map based on the single height.

Thus, the whole range image corresponds to the entire 3D point cloud of data and the "query region range image" corresponds to a portion of the 3D point cloud that the system identifies/suspects may have an occlusion region. That is, the query region may be a portion of the 3D data representing a detected object or vehicle that may have a blocked "occlusion region" behind the detected object or vehicle that the sensors are not able to sense. To determine if any occlusion regions exist, the system compares the range value of a second pixel (of a second set of pixels, with each second pixel representing a respective range value) to a range value of a first pixel (of a first set of pixels, with each first pixel representing a respective range value). The first and second pixel may correspond to a same coordinate. Based on whether the range value is greater or less than the range value of the first pixel, the system classifies the pixel. Thus, the system uses range images (instead of 3D point clouds) to generate the occlusion maps, and thus the system may save on computing resources.

The range images include two dimensions (x and y) where each coordinate also stores range image (z dimension). This is represented by a shading/intensity rather than a coordinate so the range image may be referred to as a 2.5 dimensional image. That is, the range image may be constructed by projecting lidar points in 3D rectangular coordinates onto a 2.5D representation, comprising an image plane where pixel coordinates are determined by azimuth-elevation bins and pixel values store range information. If more than one lidar point falls within a pixel, the minimum range is stored as its value.

As described above, the vehicular sensing system generates a virtual range image for the three-dimensional point cloud of data that includes a set of points representing the three-dimensional point cloud of data. Thus, the virtual range image represents the three-dimensional scene exterior of the vehicle within the field of sensing of the sensor. Each point (i.e., virtual pixel) of the set of points includes a respective location and a respective range value. In particular, the respective location may represent an X-Y coordinate of the respective point while the respective range value represents a depth of the respective point. The vehicular sensing system classifies each respective point as occluded or non-occluded by comparing the respective range value with a threshold range value associated with the respective point. Here, the threshold range value may correspond to a maximum range value. Accordingly, when the respective range value is less than the threshold range value, the respective point is classified as occluded and, when the respective range value is greater than or equal to the threshold range value, the respective point is classified as non-occluded.

The vehicular sensing system may detect objects (i.e., static or moving objects) by identifying a group of adjacent points classified as occluded. That is, a threshold number of adjacent points may need to be classified as occluded before the vehicular sensing system detects an object. Moreover, the vehicular sensing system determines one or more occlusion regions based on the classification for the respective points. Each occlusion region includes a region that is within the field of sensing of the sensor but that is not sensed by the sensor due to an object obstructing the sensor from the sensing region. Put another way, the occlusion region is a region that would otherwise be sensed by the sensor if the object was not obstructing the sensor from sensing that region. Each occlusion region determined by the vehicular sensing system corresponds to an area or region located behind a point classified as occluded. That is, since the occluded point may obstruct the sensor from sensing the region behind the occluded point, the vehicular sensing system determines the area behind the occluded points as occlusion regions.

To that end, the vehicular sensing system may track other objects entering into the determined occlusion regions. That is, tracking a first object that moves behind a second object such that the second object blocks the first object from being sensed by the sensor. By tracking objects entering into the occlusion regions, the vehicular sensing system predicts where the objects will exit from the occlusion region before the object is sensed again by the sensor. Advantageously, by predicting where objects will exit from the occlusion region before the object remerges from the occlusion region, the vehicular sensing system have a better understanding of the environment surrounding the vehicle even though some objects may be temporarily obstructed from sensing the sensor.

The system may be suitable for driver-operated vehicles and/or for autonomous vehicles, whereby the vehicle is controlled or maneuvered along the road by the system. For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The sensor may comprise any suitable sensor, such as a radar sensor, a lidar sensor, an ultrasonic sensor or the like. The system thus may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Optionally, it is envisioned that the sensor may comprise a forward and/or rearward viewing camera disposed at the exterior mirror or other sideward portion of the vehicle. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340;

11

US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
a sensor disposed at a vehicle equipped with the vehicular sensing system and sensing exterior of the vehicle;
an electronic control unit (ECU) comprising electronic circuitry and associated software;
wherein the sensor is operable to capture sensor data;
wherein sensor data captured by the sensor is transferred to the ECU;
wherein the electronic circuitry of the ECU comprises a data processor for processing sensor data captured by the sensor;
wherein, via processing at the ECU of sensor data captured by the sensor, the vehicular sensing system generates a three-dimensional point cloud of data representing a three-dimensional scene exterior of the vehicle within a field of sensing of the sensor;
wherein the vehicular sensing system, based at least in part on the three-dimensional point cloud of data, generates a virtual range image for the three-dimensional point cloud of data, wherein the virtual range image comprises a 2.5-dimensional data structure having a set of pixels whose coordinates are determined by azimuth and elevation bins and whose values store range information, the set of points representing the three-dimensional point cloud of data, and wherein each point of the set of points comprises a respective location and a respective range value;
wherein the vehicular sensing system, for each respective point of the set of points, classifies the respective point as occluded or non-occluded by comparing the respective range value with a threshold range value associated with that respective point;
wherein the vehicular sensing system determines one or more occlusion regions based on the classification for the respective points, each occlusion region comprising a region that is within the field of sensing of the sensor but that is not sensed by the sensor due to an object obstructing the sensor from sensing the region; and

wherein the vehicular sensing system tracks a moving detected object as it enters an occlusion region and predicts where the moving detected object will exit from the occlusion region.

2. The vehicular sensing system of claim 1, wherein the three-dimensional point cloud of data comprises (i) an x-dimension, (ii) a y-dimension and (iii) a z-dimension.

3. The vehicular sensing system of claim 2, wherein the x-dimension represents an azimuth dimension, wherein the y-dimension represents an elevation dimension, and wherein the z-dimension represents a range dimension.

4. The vehicular sensing system of claim 2, wherein generating the virtual range image for the three-dimensional point cloud of data comprises projecting each respective three-dimensional point of a plurality of three-dimensional points onto a two-dimensional image plane, and wherein the two-dimensional image plane comprises (i) the x-dimension at a particular z-dimension and (ii) the y-dimension at the particular z-dimension.

5. The vehicular sensing system of claim 1, wherein classifying the respective point as occluded or non-occluded comprises determining whether the respective range value of the respective point is greater than or less than the threshold range value.

6. The vehicular sensing system of claim 5, wherein the vehicular sensing system, responsive to determining that the respective range value of the respective point is less than the threshold range value, classifies the respective point as occluded.

7. The vehicular sensing system of claim 5, wherein the vehicular sensing system, responsive to determining that the respective range value of the respective point is greater than the threshold range value, classifies the respective point as non-occluded.

8. The vehicular sensing system of claim 1, wherein the sensor comprises a lidar sensor.

9. The vehicular sensing system of claim 1, wherein the sensor comprises at least one selected from the group consisting of (i) a radar sensor (ii) an ultrasonic sensor and (iii) an imaging sensor.

10. The vehicular sensing system of claim 1, wherein the vehicular sensing system initializes the threshold range value to a maximum range value.

11. The vehicular sensing system of claim 1, wherein the vehicular sensing system detects the moving detected object based on a group of one or more adjacent points being classified as occluded.

12. The vehicular sensing system of claim 11, wherein the region that is within the field of sensing of the sensor but is not sensed by the sensor due to the object obstructing the sensor from sensing the region of at least one occlusion region comprises another object.

13. The vehicular sensing system of claim 1, wherein the vehicular sensing system generates an occlusion map by projecting the classification for each respective point onto three-dimensional point cloud of data.

14. The vehicular sensing system of claim 13, wherein the occlusion map represents a particular z-dimension of the three-dimensional point cloud of data.

15. The vehicular sensing system of claim 13, wherein the occlusion map represents multiple z-dimensions of the three-dimensional point cloud of data.

16. The vehicular sensing system of claim 1, wherein, based on predicting where the moving detected object will exit from the occlusion region, the equipped vehicle is controlled to maneuver the equipped vehicle, and wherein the equipped vehicle is controlled by at least one selected from the group consisting of (i) accelerating the equipped vehicle, (ii) decelerating the equipped vehicle and (iii) steering the equipped vehicle.

17. The vehicular sensing system of claim 1, wherein the vehicular sensing system, based on the three-dimensional point cloud of data, generates another virtual range image for a region of interest of the three-dimensional point cloud of data, wherein the other virtual range image comprises another set of points representing the three-dimensional point cloud of data, and wherein each point of the other set of points comprises a respective location and the threshold range value.

18. The vehicular sensing system of claim 17, wherein comparing the respective range value with the threshold range value comprises comparing the respective range value of the respective point of the set of points with the threshold range value of a corresponding point of the other set of points.

19. The vehicular sensing system of claim 17, wherein generating the other virtual range image comprises projecting each respective point from the region of interest of the three-dimensional point cloud of data onto a two-dimensional image plane, and wherein the two-dimensional image comprises (i) an x-dimension at a particular z-dimension and (ii) a y-dimension at the particular z-dimension.

20. A vehicular sensing system, the vehicular sensing system comprising:

a sensor disposed at a vehicle equipped with the vehicular sensing system and sensing exterior of the vehicle;

an electronic control unit (ECU) comprising electronic circuitry and associated software;

wherein the sensor is operable to capture sensor data;

wherein sensor data captured by the sensor is transferred to the ECU;

wherein the electronic circuitry of the ECU comprises a data processor for processing sensor data captured by the sensor;

wherein, via processing at the ECU of sensor data captured by the sensor, the vehicular sensing system generates a three-dimensional point cloud of data representing a three-dimensional scene exterior of the vehicle within a field of sensing of the sensor;

wherein the vehicular sensing system, based at least in part on the three-dimensional point cloud of data, generates a virtual range image for the three-dimensional point cloud of data, wherein the virtual range image comprises a 2.5-dimensional data structure having a set of pixels whose coordinates are determined by azimuth and elevation bins and whose values store range information, the set of points representing the three-dimensional point cloud of data, and wherein each point of the set of points comprises a respective location and a respective range value;

wherein the vehicular sensing system, based at least in part on the three-dimensional point cloud of data, generates another virtual range image for a region of interest of the three-dimensional point cloud of data, wherein the other virtual range image comprises another set of points representing the three-dimensional point cloud of data, and wherein each point of the other set of points comprises a respective location and a maximum range value;

wherein the vehicular sensing system, for each respective point of the set of points, classifies the respective point as occluded or non-occluded by comparing the respective range value of the respective point with the maximum range value of a corresponding point of the other set of points;

wherein the vehicular sensing system determines one or more occlusion regions based on the classification for the respective points, each occlusion region comprising a region that is within the field of sensing of the sensor but that is not sensed by the sensor due to an object obstructing the sensor from sensing the region; and wherein the vehicular sensing system tracks a moving detected object as it enters an occlusion region and predicts where the moving detected object will exit from the occlusion region.

21. The vehicular sensing system of claim 20, wherein the vehicular sensing system, responsive to determining that the respective range value of the respective point is less than the maximum range value, classifies the respective point as occluded.

22. The vehicular sensing system of claim 20, wherein the vehicular sensing system, responsive to determining that the respective range value of the respective point is greater than or equal to the maximum range value, classifies the respective point as non-occluded.

23. A vehicular sensing system, the vehicular sensing system comprising:

a sensor disposed at a vehicle equipped with the vehicular sensing system and sensing exterior of the vehicle;

an electronic control unit (ECU) comprising electronic circuitry and associated software;

wherein the sensor is operable to capture sensor data;

wherein sensor data captured by the sensor is transferred to the ECU;

wherein the electronic circuitry of the ECU comprises a data processor for processing sensor data captured by the sensor;

wherein, via processing at the ECU of sensor data captured by the sensor, the vehicular sensing system generates a three-dimensional point cloud of data representing a three-dimensional scene exterior of the vehicle within a field of sensing of the sensor;

wherein the vehicular sensing system, based at least in part on the three-dimensional point cloud of data, generates a virtual range image for the three-dimensional point cloud of data, wherein the virtual range image comprises a 2.5-dimensional data structure having a set of pixels whose coordinates are determined by azimuth and elevation bins and whose values store range information, the set of points representing the three-dimensional point cloud of data, and wherein each point of the set of points comprises a respective location and a respective range value;

wherein the vehicular sensing system, for each respective point of the set of points, classifies the respective point as occluded or non-occluded by comparing the respective range value with a threshold range value associated with that respective point;

wherein the vehicular sensing system determines one or more occlusion regions based on the classification for the respective points, each occlusion region comprising a region that is within the field of sensing of the sensor but that is not sensed by the sensor due to an object obstructing the sensor from sensing the region;

wherein the vehicular sensing system detects a moving object based on a group of one or more adjacent points being classified as occluded; and wherein the vehicular sensing system tracks the detected moving object as it enters an occlusion region and predicts where the detected moving object will exit from the occlusion region before the detected moving object will be sensed by the sensor again.

24. The vehicular sensing system of claim 23, wherein classifying the respective point as occluded or non-occluded comprises determining whether the respective range value of the respective point is greater than or less than the threshold range value.

25. The vehicular sensing system of claim 23, wherein the vehicular sensing system generates an occlusion map by projecting the classification for each respective point onto three-dimensional point cloud of data.

26. The vehicular sensing system of claim 25, wherein, based on the occlusion map, the equipped vehicle is controlled to maneuver the equipped vehicle.

* * * * *